US 9,557,798 B2

(12) United States Patent
Sako et al.

(10) Patent No.: US 9,557,798 B2
(45) Date of Patent: Jan. 31, 2017

(54) POWER CONTROL DEVICE AND POWER CONSUMING DEVICE

(71) Applicant: Sony Corporation, Tokyo (JP)

(72) Inventors: Yoichiro Sako, Tokyo (JP); Yasuhiro Yamada, Tokyo (JP); Akira Tange, Tokyo (JP); Satoshi Higano, Kanagawa (JP)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 14/391,770

(22) PCT Filed: Feb. 7, 2013

(86) PCT No.: PCT/JP2013/052891
§ 371 (c)(1),
(2) Date: Oct. 10, 2014

(87) PCT Pub. No.: WO2013/161342
PCT Pub. Date: Oct. 31, 2013

(65) Prior Publication Data
US 2015/0074441 A1 Mar. 12, 2015

(30) Foreign Application Priority Data
Apr. 26, 2012 (JP) .................................. 2012-100800

(51) Int. Cl.
G06F 1/32 (2006.01)
H02J 3/14 (2006.01)
H02J 3/00 (2006.01)

(52) U.S. Cl.
CPC ............... *G06F 1/3234* (2013.01); *H02J 3/14* (2013.01); *H02J 2003/003* (2013.01);
(Continued)

(58) Field of Classification Search
CPC ............ G06F 1/26; G06F 1/3202; G06F 1/30; G06F 1/305; G06F 1/24
See application file for complete search history.

(56) References Cited

U.S. PATENT DOCUMENTS

2007/0067656 A1* 3/2007 Ranganathan ........ G06F 1/3203
713/320
2010/0204845 A1 8/2010 Ohuchi et al.
(Continued)

FOREIGN PATENT DOCUMENTS

CN 101627515 A 1/2010
CN 102379075 A 3/2012
(Continued)

OTHER PUBLICATIONS

Aug. 18, 2015, JP communication issued for related JP application No. 2014-512383.
(Continued)

*Primary Examiner* — Zahid Choudhury
(74) *Attorney, Agent, or Firm* — Paratus Law Group, PLLC

(57) ABSTRACT

A power control device 10 is a power control device that controls power supply from an outside to a plurality of power consuming devices 50, and includes a power supply control device 20 that obtains consumed power values of the plurality of power consuming devices 50 and predicts consumed power values, and controls power supply to the power consuming devices 50 when a prediction value of a total of the obtained consumed power values based on the prediction exceeds a predetermined power value.

18 Claims, 3 Drawing Sheets

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 2010/0262312 A1 | 10/2010 | Kubota et al. | |
| 2011/0087382 A1* | 4/2011 | Santacatterina | H02J 3/14 700/291 |
| 2011/0153107 A1 | 6/2011 | Kim et al. | |
| 2012/0065792 A1 | 3/2012 | Yonezawa et al. | |
| 2014/0365017 A1* | 12/2014 | Hanna | F24F 11/001 700/276 |

FOREIGN PATENT DOCUMENTS

| | | |
|---|---|---|
| JP | 05-049169 | 2/1993 |
| JP | 2002-078246 | 3/2002 |
| JP | 2004-056196 | 2/2004 |
| JP | 2006-158146 | 6/2006 |
| JP | 2006-230146 | 8/2006 |
| JP | 2007-020260 | 1/2007 |
| JP | 2007-299624 | 11/2007 |
| JP | 2010-016989 | 1/2010 |
| JP | 2010-193303 | 9/2010 |
| JP | 2011-142771 | 7/2011 |
| JP | 2011-166884 | 8/2011 |
| JP | 2011-239470 | 11/2011 |
| JP | 2011-250027 | 12/2011 |
| JP | 2011-254229 | 12/2011 |

OTHER PUBLICATIONS

Mar. 29, 2016, Chinese Office Action for related CN Application No. 201380020633.2.
May 18, 2016, European Communication for related EP Application No. 13781246.7.
Jul. 26, 2016, JP communication issued for related JP application No. 2015-221051.
Sep. 5, 2016, EP communication issued for related EP application No. 13781246.7.
Nov. 15, 2016, JP communication issued for related JP application No. 2015-221051.

* cited by examiner

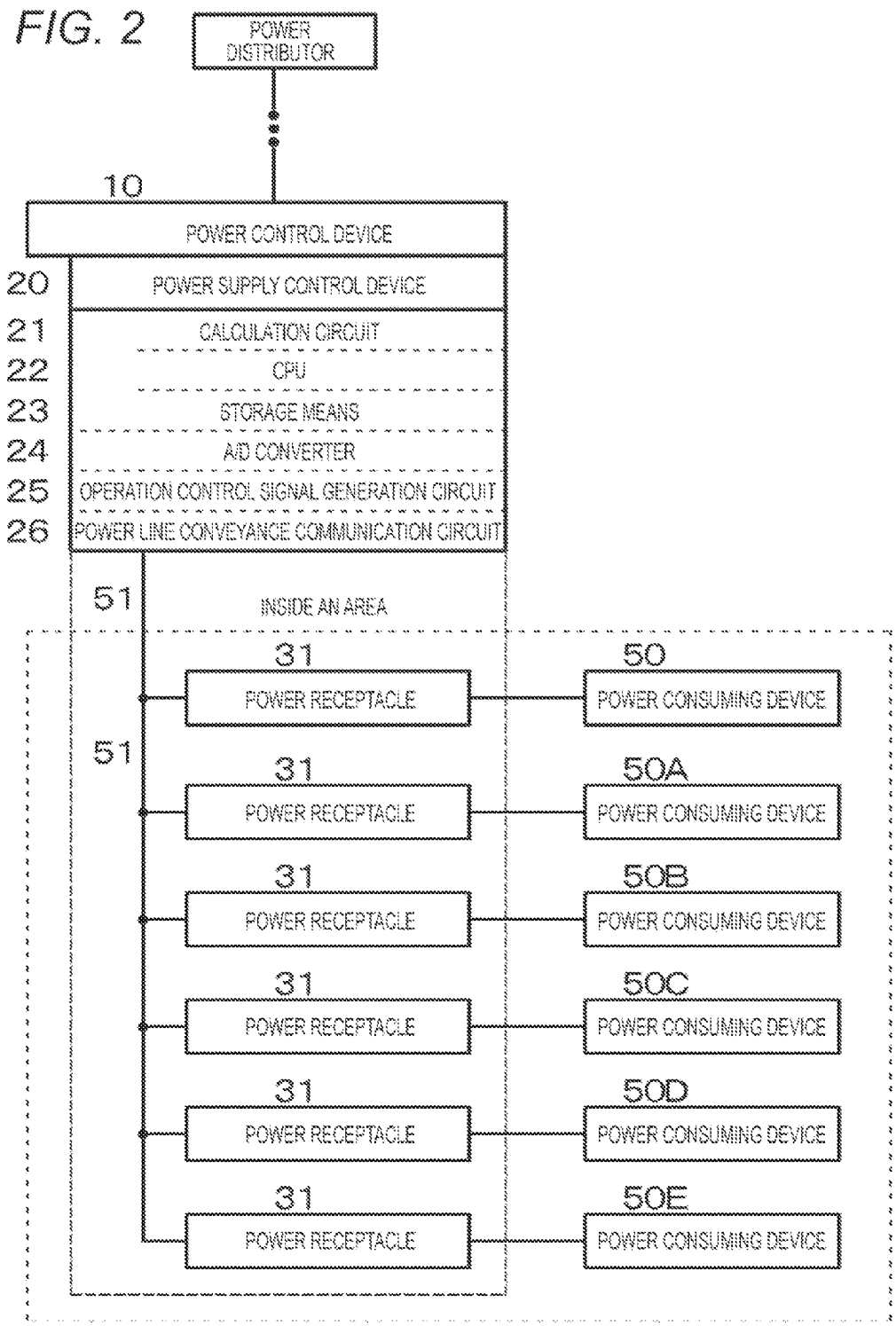

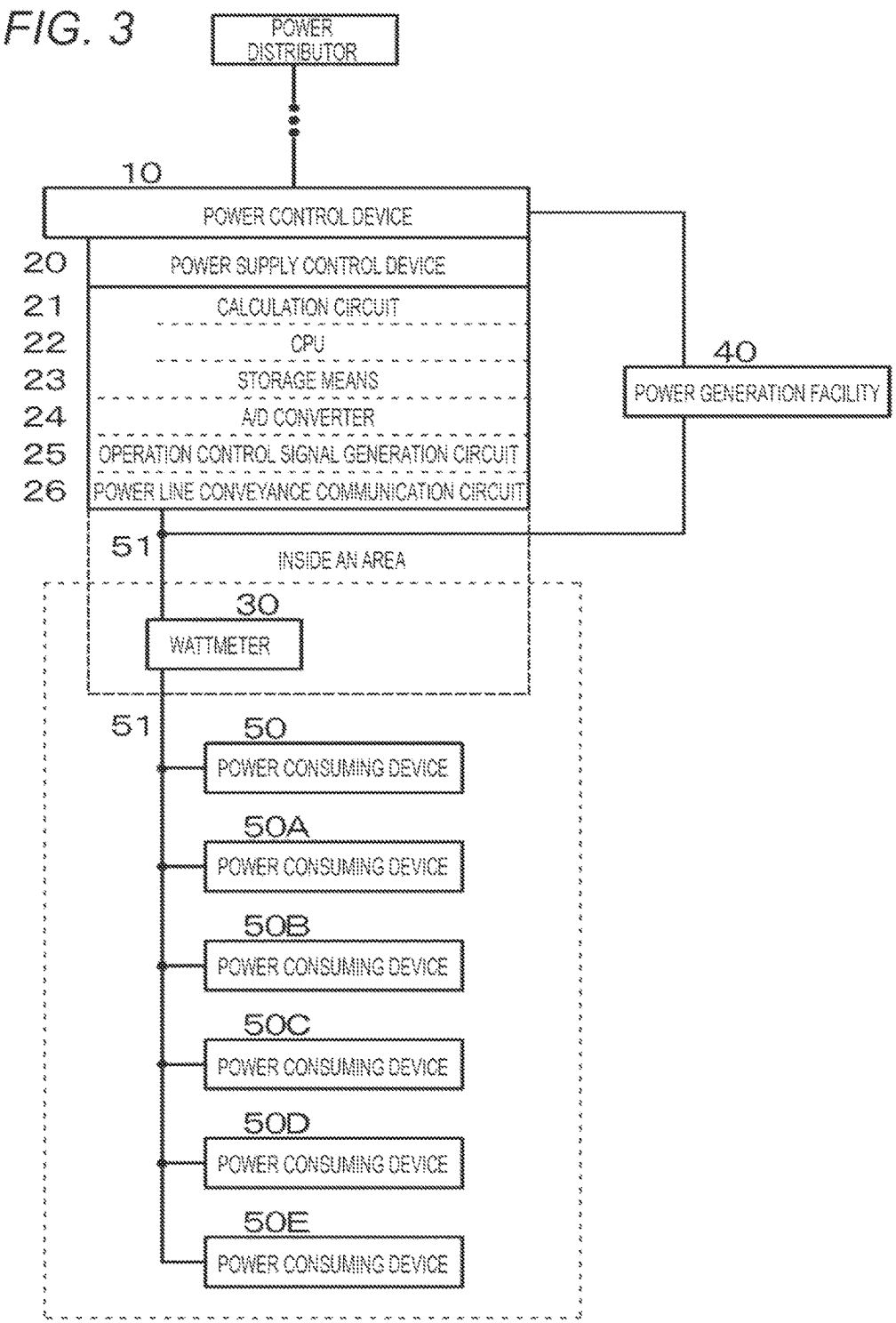

POWER CONTROL DEVICE AND POWER CONSUMING DEVICE

CROSS REFERENCE TO PRIOR APPLICATION

This application is a National Stage Patent Application of PCT International Patent Application No. PCT/JP2013/052891 (filed on Feb. 7, 2013) under 35 U.S.C. §371, which claims priority to Japanese Patent Application No. 2012-100800 (filed on Apr. 26, 2012), which are all hereby incorporated by reference in their entirety.

TECHNICAL FIELD

The present disclosure relates to a power control device and a power consuming device.

BACKGROUND ART

Various proposals have been made to stably supply power to a large number of power consuming devices arranged inside homes, office, buildings, and the like. For example, Japanese Patent Application Laid-Open No. 2007-020260 discloses a power supply system including:

a storage battery configured to be charged with power from a lamp line, a converting unit connected between a watt-hour meter and a home switchboard, and configured to control the storage battery and to convert supplied DC power into commercial AC power, and means for linking control of a charge/discharge operation of the storage battery to a power rate of the power supplied from the lamp line.

The power supply system further includes:

a controller capable of performing communication with the converting unit, a communication device having functions to control devices and to measure states, and connected to the controller, and means for collecting consumed power amounts and states of the devices, and transmitting the consumed power amounts and the states to the communication device.

Then, in Japanese Patent Application Laid-Open No. 2007-020260, a device controller 900 creates control data of devices 50n from the operation states and the consumed power of the devices 50n so as to suppress a peak of power consumption, and controls discharging of a storage battery 202 by controlling the devices 50n and controlling an operation of a converting unit 201 so as to comply with the entire consumed power (see the paragraph [0045] of Japanese Patent Application Laid-Open No. 2007-020260).

Further, a power packet system that enables supply and reception between customers in an end-to-end manner by delivering power energy with a power packet to which heater information is attached is known from Japanese Patent Application Laid-Open No. 2011-142771.

CITATION LIST

Patent Document

Patent Document 1: Japanese Patent Application Laid-Open No. 2007-020260
Patent Document 2: Japanese Patent Application Laid-Open No. 2011-142771

SUMMARY OF THE INVENTION

Problems to be Solved by the Invention

By the way, in Japanese Patent Application Laid-Open No. 2007-020260, the devices are controlled to suppress a peak of power consumption from the operation states and the consumed power of the devices. Therefore, fine power supply control is difficult. Further, in Japanese Patent Application Laid-Open No. 2011-142771, consumed power/generated power/stored power in a customer is adjusted and controlled to cover the power within the customer, and when necessary power is insufficient, "power request information" that requests supply of power is transmitted together with an insufficient amount, and power is supplied from a power packet switch and supplied to the customer. However, control of power supply to the power consuming devices of when necessary power is insufficient is not mentioned at all.

Therefore, an objective of the present disclosure is to provide a power control device that can finely control power supply from an outside to a plurality of power consuming devices when necessary power is insufficient, and a power consuming device connected to the power control device.

Solution to Problems

A power control device of the present disclosure for achieving the above objective is a power control device (a kind of power router) configured to control power supply from an outside to a plurality of power consuming devices, the power control device including:

a power supply control device configured to obtain consumed power values of the plurality of power consuming devices and predicts consumed power values, and to control power supply to the power consuming devices when a prediction value of a total of the obtained consumed power values based on the prediction exceeds a predetermined power value. Note that "controlling power supply to power consuming devices" is equivalent to controlling operations of the power consuming devices based on power supply. The same applied to the following description.

A power consuming device of the present disclosure for achieving the above objective is a power consuming device connected to a power control device (a kind of power router), and supplied power from an outside, the power control device including a power supply control device that obtains consumed power values of a plurality of power consuming devices and predicts consumed power values, and controls power supply to the power consuming devices when a prediction value of a total of the obtained consumed power values based on the prediction exceeds a predetermined power value, and an operation control signal that controls operations of the power consuming devices being transmitted together with supply of power from the power supply control device.

Effects of the Invention

The power control device of the present disclosure or a power control device to which a power consuming device of the present disclosure is connected (hereinafter, these power control devices may be collectively called "power control device or the like of the present disclosure") evaluates whether a prediction value of a total of consumed power values of a plurality of power consuming devices exceeds a predetermined power value, thereby finely controlling power supply to the plurality of power consuming devices from an outside. That is, the power control device can finely control an instruction of stop or reduction of the power supply, power saving, and the like to the power consuming devices connected to the power control device. Further, the power control device can control power reception corresponding to used amperage from a power company. Therefore, the power control device can avoid a risk that an ampere breaker is suddenly tripped due to excessive use of electricity, or the like. Further, the power control device can control the power saving of a group of power consuming devices as a whole inside a home, an office, a building, or the like, and can achieve smoothing of the used power amount throughout the day.

BRIEF DESCRIPTION OF DRAWINGS

FIG. 2 is a conceptual diagram of a modification of the power control device of Embodiment 1 and power control devices.

FIG. 3 is a conceptual diagram of a power control device and power consuming devices of Embodiment 4.

MODE FOR CARRYING OUT THE INVENTION

Figure 1:
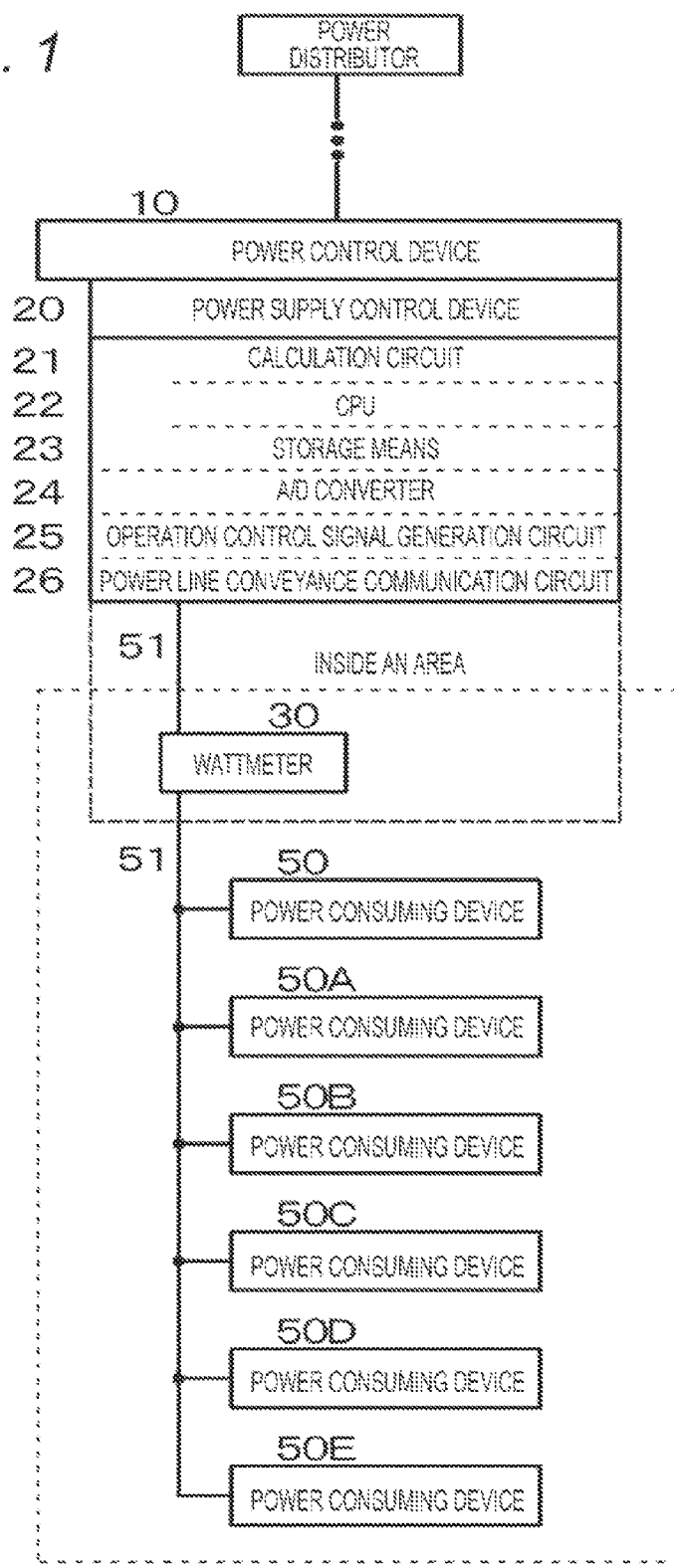
FIG. 1 is a conceptual diagram of a power control device and power consuming devices of Embodiment 1.

Hereinafter, the present disclosure will be described based on embodiments with reference to the drawings. The present disclosure is not limited to the embodiments, and various numerical values and materials in the embodiments are exemplarily described. Note that the description will be given in the following order.
1. Overall description of a power control device and a power consuming device of the present disclosure
2. Embodiment 1 (a power control device and a power consuming device)
3. Embodiment 2 (a modification of Embodiment 1)
4. Embodiment 3 (a modification of Embodiments 1 and 2)
5. Embodiment 4 (a modification of Embodiments 1 to 3)
6. Embodiment 5 (a modification of Embodiments 1 to 4), and others

[Overall Description of a Power Control Device and a Power Consuming Device of the Present Disclosure]

In a power control device or the like of the present disclosure, a power supply control device can be configured to obtain a consumed power value of a power consuming device by measuring the consumed power value of the power consuming device. Alternatively, the power supply control device can be configured to obtain a nominal consumed power value of the power consuming device as the consumed power value. In this case, the power supply control device can be configured to measure a consumed power value of a predetermined power consuming device, and to control power supply to the power consuming device of predetermined power consuming device based on a difference between the nominal consumed power value and a measurement value of the consumed power value of the predetermined power consuming device. The measurement of the consumed power value of the power consuming device may be individually performed with respect to each of a plurality of power consuming devices, or may be performed with respect to the plurality of power consuming devices as a whole. Alternatively, the plurality of power consuming devices is grouped, and the measurement is performed with respect to each group. Examples of a device for measuring the consumed power value of the power consuming device include a wattmeter, and a power receptacle and a power supply tap having functions of power measurement, control, and communication (to be specific, a receptacle type, a table tap type, an extension adaptor type, and the like). Examples of the total of consumed power values of a plurality of power consuming devices include:
(a) a total of measurement values of consumed power values of the power consuming devices,
(b) a total of nominal consumed power values of the power consuming devices, and
(c) a grand total of the total of measurement values of consumed power values of the power consuming devices and the total of nominal consumed power values of the power consuming devices other than the total of measurement values.

When the nominal consumed power values of the power consuming devices are used as the consumed power values, the power control device or the like of the present disclosure may be configured to further include a nominal consumed power value storage device that stores the nominal consumed power values of the power consuming devices. Note that the nominal consumed power value storage device may be integrally configured with the power supply control device, or may be configured as a separate device (circuit) from the power supply control device. Then, in these cases, an example of the nominal consumed power value storage device includes a combination of a CPU and storage means (a memory, or the like). To cause the nominal consumed power value storage device to store the nominal consumed power values of the power consuming devices, for example, predetermined information including the nominal consumed power values of the power consuming devices may just be input to the nominal consumed power value storage device using an input device or a personal computer, or communication means such as a mobile phone and a communication line. When using the communication means and the communication line, it is desirable that the power control device or the like of the present disclosure includes a communication device.

In the power control device or the like of the present disclosure including the above-described various favorable configurations, the control of the power supply to the power consuming devices can be configured from stop of the power supply to the power consuming devices or a decrease in (reduction of) a power supply amount. Alternatively, the control of the power supply to the power consuming devices can be configured from an operation stop instruction to the power consuming devices or a power used amount decrease (reduction) instruction to the power consuming devices. An example of the power used amount decrease instruction to the power consuming devices includes a transfer instruction to the power consuming devices into a consumed power decrease (reduction) state (for example, a power saving mode, a sleep mode, an energy saving mode, or the like). Then, in these cases, it is favorable that the instruction to the power consuming devices is performed through a power line connecting between the power control device and the power consuming devices, and further, it is favorable that the instruction to the power consuming devices is performed based on a modulated electrical signal (operation control signal). To be specific, a power line carrier communication (PLC) technology may just be used. Note that the way of transmitting the instruction is not limited to the technology, and wireless communication, a communication line, or a public line can be used. In this case, it is desirable that the power control device or the like of the present disclosure includes a communication device.

Alternatively, the power control device or the like of the present disclosure including the above-described various favorable configurations can be configured to further include a power supply priority order storage device that stores a priority order of power supply to the power consuming devices. In this case, the power supply priority order storage device can be configured to store a power consuming device which stop of the power supply, stop of an operation, a decrease in (reduction of) a power supply amount, or a decrease in (reduction of) a power used amount should be prohibited. Note that the control of the power supply is not limited to the configuration. For example, a configuration may be employed, in which the power supply control device performs an inquiry to the power consuming devices before starting stop of the power supply or a decrease in a power supply amount, and when having received information that a power consuming device being a power consuming device which stop of the power supply, stop of an operation, a decrease in a power supply amount, or a decrease in a power used amount should be prohibited from a power consuming device, the power supply control device does not perform the stop of the power supply, and the like to the power consuming device. As the power consuming devices which the stop of the power supply, and the like should be prohibited, aspirators including nebulizers and steam aspirators, various medical devices including oxygen concentrators, pulse oximeters, artificial respirators, sleep apnea syndrome monitors, artificial dialyzers, blood purification devices, patient monitoring devices, syringe pumps, transport pumps, and home medical devices, security-related devices including electronic locks, and monitoring cameras, computers energized throughout the night, and refrigerators for business use can be exemplarily described. An example of the power supply priority order storage device includes a combination of a CPU and storage means (memory). The power supply propriety order storage device may be also used as the nominal consumed power value storage device, may be integrally configured with the power supply control device, or may be configured as a separate device (circuit) from the power supply control device.

Further, the power control device or the like of the present disclosure including the above-described favorable configurations further includes a power generation facility. The power supply control device can be configured to perform power supply from the power generation facility to the power consuming devices when the prediction value of the total of the obtained consumed power values exceeds a predetermined power value. Here, the power generation facility can be configured from a secondary battery facility. Note that the secondary battery facility itself can have a known configuration or structure.

Further, the power control device or the like of the present disclosure including the above-described favorable configurations can be configured to control power supply to the power consuming devices based on used amperage inside an area. In this case, the inside an area is inside a room, inside a home, inside an office, inside a building, or an installation unit of an ampere breaker or a switchboard. However, the inside an area is not limited to the above examples, and for example, a region unit, a town unit, a neighborhood association unit, a housing complex unit, or the like can be employed.

Further, the power control device or the like of the present disclosure including the above-described favorable configurations can employ a configuration of a packet structure in which power supplied to the power consuming devices is configured from header information including a payload corresponding to the power and a payload length of the payload. As the header information, information related to a power amount and a type of power (for example, thermal power generation using oil or coal, power generation based on natural gas, nuclear power generation, hydroelectric power generation, solar power generation, wind power generation, geothermal power generation, biomass power generation, tidal power generation, green energy using power of nature, such as ocean thermal energy conversion), an AC/DC discrimination flag, a voltage value, a code or an ID of country or region, a code or an ID of power generation/manufacture company, a classification flag of for business consumption/for home consumption, a power transmission source address, power transmission source identification information, a power transmission destination address, power transmission destination identification information, a next header tag, a unit price, carbon dioxide emission per power generation unit time, and information of a power transmission/distribution path can be exemplarily described. Further, in this case, it is favorable that the power control device includes packet decomposition means, and in some case, the power control device may include packet generation means.

Examples of the prediction of the consumed power values in the power control device or the like of the present disclosure including the above-described favorable configurations include:
(a) prediction of the consumed power values of the power consuming devices based on nominal consumed power values,
(b) prediction based on past weather data,
(c) prediction based on weather information and weather forecast,
(d) prediction based on a trend or a tendency of change of temperature measured values (for example, room temperature measured values),
(e) prediction based on a period of time or a season,
(f) prediction based on expectation of demand for power,
(g) prediction based on a database related to power consumption patterns in the power consuming devices,
(h) prediction of variation in a unit of a day, a week, a month, or a year, and
(i) prediction based on change or variation of a total of the consumed power values obtained per unit period.

Further, in the power control device or the like of the present disclosure including the above-described favorable configurations, the predetermined power value may be a constant power value, or may be changed according to a season or a period of time. For example, the predetermined power value may be a power value based on the expectation of demand for power conducted in a power company, or the like. Alternatively, examples of the predetermined power value include a contract ampere value, a total of contract ampere values in a building, a region unit, a town unit, a neighborhood association unit, or a housing complex unit, and a % of the contract ampere value or of the total of contract ampere values ($\alpha$ is any numerical value, such as 80 or 90). When the prediction value of the total of the obtained consumed power value exceeds the predetermined power value even for a moment, the prediction value of the total of the obtained consumed power values may be considered to exceed the predetermined power value. When a state in which the prediction value of the total of the obtained consumed power values exceeds the predetermined power value is continued for a period t, (t is an arbitrary time, such as one second, ten seconds, thirty seconds, one minute, five minutes, or ten minutes), the prediction value of the total of the obtained consumed power values may be considered to exceed the predetermined power value. The determination of whether the prediction value of the total of the obtained consumed power values exceeds the predetermined power value may be performed based on the measurement values of the consumed power values of the power consuming devices, as described above, may be performed based on nominal consumed power values of the power consuming devices, or may be performed based on the measurement values of the consumed power values and the nominal consumed power values of the power consuming devices.

It is desirable that the power control device or the like of the present disclosure is connected to the Internet in the viewpoint of acquisition and exchange of various data. Further, various devices and circuits that configure the power control device may be integrally configured or may be arranged as separate devices and circuit in the power control device. For example, the various devices and circuits may be mutually connected through communication means or signal transmission means.

As operation states of the power consuming devices of when the consumed power values of the power consuming devices are obtained, for example, whether the power is applied to the power consuming devices, whether the states are immediately after the power consuming devices have started operations, whether the power consuming devices are stably operated, whether the power consuming devices are in a low power consumption state, and the like can be exemplarily described. For example, in a refrigerator, a freezer, or an air conditioner, the power consumption amount is rapidly increased at the time of startup of a compressor. In a laser printer, the power consumption amount is rapidly increased at the time of start of printing. Further, in a washing machine, the power consumption amount substantially varies by storing of water, washing, rinsing, dewatering, and the like. Meanwhile, for example, in a personal computer, a television receiver, an audio device, a video recorder, or the like, the variation of the power consumption amount is small. Examples of the power consuming device include a power consuming device that is always operated, such as a refrigerator, a power consuming device that is operated for a long time, such as an air conditioner or an electric fan, a power consuming device that is operated for several hours at least, such as a personal computer, a television receiver, an audio device, a video recorder, a rice cooker, a water heating pot, an electric pot, a coffee maker, a charger of mobile phone, a secondary battery charger of electric car, a power consuming device that is operated for about one hour, such as a washing machine, a clothes dryer, a dishwasher, a vacuum cleaner, a hotplate, or a grill pan, and a power consuming device that is operated for about several minutes to several tens of minutes, such as a dryer, a microwave oven, an oven, and various printers.

Examples of a configuration to control the power supply to the power consuming devices include, to be specific, the stop (or restriction) of the power supply to, and a decrease in (reduction of) the power supply amount of each of the power consuming devices or the plurality of power consuming devices as a whole, as described above. Then, in these cases, the power control device or the like of the present disclosure, a power distributor, or a power recipient may control supply of power or power transmission/reception according to a predetermined procedure. To be specific, for example, the power transmission/reception may be stopped using a switch, or the power transmission/reception may be controlled (reduced) based on a method of sending a control signal of stop of operations or operation mode change to the power consuming devices, and causing the power consuming devices to follow the control. The power supply from an outside to the plurality of power consuming devices may be performed through the power control device, or may be performed without through the power control device. Alternatively, as a configuration of the control of the power supply to the power consuming devices, a configuration to display to what extent the power consuming devices have consumed the power or will consume the power in a display device, or the like is included. Accordingly, a user of the power consuming devices can suspend, stop, or interrupt use of a part of the power consuming devices, can switch an operation mode of the power consuming devices to a power saving mode, a sleep mode, or the like, or can take measures, such as changing of the power consuming devices to be used.

An example of a configuration of the power supply from an outside includes power supply through a distribution line (including a transmission line and an electric wire). Examples of a distribution network system include a spot network system, a regular network system (low-pressure network system), a low-pressure banking system, a main-auxiliary line system (annular system), and a dendritic system (radial system). Further, the distribution line includes a high voltage distribution line (that is overhead wire in residential districts, and is a distribution line typically used as leading wire exceeding 50 kVA, and equal to or less than 2000 kVA), a low voltage distribution line (a distribution line typically used as leading wire equal to or less than 50 kVA for detached houses, and the like).

[Embodiment 1]

Embodiment 1 relates to a power control device and power consuming devices of the present disclosure. A conceptual diagram of a power control device and power consuming devices of Embodiment 1 is illustrated in FIG. 1, and a conceptual diagram of a modification of the power control device and the power consuming devices is illustrated in FIG. 2.

A power control device 10 of Embodiment 1 is a power control device that controls power supply from an outside to a plurality of power consuming devices 50. Further, the power control device 10 includes a power supply control device 20 that obtains consumed power values of the plurality of power consuming devices 50 and predicts consumed power values, and controls the power supply to the power consuming devices when a prediction value of a total of the obtained power consuming values based on the prediction exceeds a predetermined power value.

Further, the power consuming device 50 of Embodiment 1 is a power consuming device connected to the power control device 10 of Embodiment 1 through a power line 51, and supplied power from an outside. Then, an operation control signal (modulated electrical signal) that controls operations of the power consuming devices 50 is transmitted from the power supply control device 20 together with supply of power.

Here, as illustrated in FIG. 1, the power supply control device 20 includes a wattmeter 30. Alternatively, as illustrated in FIG. 2, the power supply control device 20 can be configured from power receptacles 31 or power supply taps having functions of power measurement, control, and communication. Then, the power supply control device 20 obtains the consumed power values of the power consuming devices 50 by measuring the consumed power values of the power consuming devices 50. That is, the power supply control device 20 measures the consumed power values of the power consuming devices 50, and estimates whether a prediction value of a total of the measured consumed power values of the plurality of power consuming devices 50 exceeds a predetermined power value. The measurement of the consumed power values of the power consuming devices 50 by the power supply control device 20 may be individually performed with respect to each of the plurality of power consuming devices 50 (see FIG. 2), or may be performed with respect to the plurality of power consuming devices 50 as a whole (see FIG. 1). The plurality of power consuming devices 50 is grouped, and the measurement may be performed with respect to each group.

The power supply control device 20 includes, for example, a calculation circuit 21 configured from a CPU 22 and storage means (memory) 23, an A/D converter 24, an operation control signal generation circuit 25, and a power line conveyance communication circuit (power line modem) 26. The storage means 23 stores various programs that operate the power supply control device 20, a predetermined power value (Ps), and various data related to prediction. Configuration elements of the power supply control device 20 can be configured from known elements.

The predetermined power value Pc may be a constant power value, may be changed according to a season or a period of time, or may be a power value based on expectation of demand for power conducted by a power company, or the like, for example.

For example, to what extent the consumed power value is increased at the time when the power is applied to a power consuming device can be predicted based on a consumed power measurement value of the power consuming device. Alternatively, consumed power prediction values of a plurality of power consuming devices can be obtained based on past weather data, weather information or weather forecast, a period of time or a season, or a trend or a tendency of change of temperature measured values (for example, room temperature measured values). For example, an increase of the consumed power amount of an air conditioner of when the temperature is raised by 1° C. can be statistically measured, for example. Alternatively, the consumed power prediction values of a plurality of power consuming devices can be obtained based on expectation of demand for power sent from a power company, or the like through the Internet. Further, the consumed power prediction value of the plurality of power consuming devices can be obtained based on prediction based on a database related to a power consumption patterns in the power consuming devices 50 connected to the power control device 10, variation in a unit of one day, one week, one month, or one year, or change or variation of a total of the consumed power values obtained per unit period. The power control device 10 learns the variation in a unit of one day, one week, one month, or one year, and makes the power consumption patterns obtained as a result of the learning into a database, thereby creating the database related to the power consumption patterns in the power consuming devices 50. These various data are stored in the storage means 23. To be specific, the prediction may just be a coefficient associated with various conditions (use environments of the power consuming devices, and the like), for example, and can be obtained based on accumulation of data, such as a past power use tendency, and the like. Further, for example, a total value is multiplied by the coefficient (for convenience, called "prediction coefficient"), so that a prediction value of the total value can be obtained.

The power control device 10 controls the power supply to the power consuming devices 50 based on used amperage inside an area. To be specific, the inside area can be inside a room, a home, an office, a building, or the like, can be an installation unit of an ampere breaker or a switchboard, or can be a region unit, a town unit, a neighborhood association unit, a housing complex unit, or the like. The power control device 10 of Embodiment 1 is connected to the Internet (not illustrated).

A total value $P_{Total}$ of the consumed power values of the plurality of power consuming devices 50 measured by the wattmeter 30 or the like is sent to the A/D converter 24, converted into a digital signal, and sent to the CPU 22. The CPU 22 reads out the predetermined power value $P_0$ stored in the storage means 23, further reads out the prediction data (prediction coefficient), and compares the predetermined power value $P_0$ and a prediction value of the total value $P_{Total}$ of the consumed power values of the plurality of power consuming devices 50. Here, the prediction value of the total value $P_{Total}$ is a value obtained in consideration of the prediction data, that is, a value obtained such that the total value $P_{Total}$ is multiplied by the prediction coefficient. Then, when the power supply control device 20 has evaluated (determined) that the prediction value of the total value $P_{Total}$ has exceeded, or is going to exceed the predetermined power value $P_0$, or a state in which the prediction value of the total value $P_{Total}$ has exceeded the predetermined power value $P_0$ has been continued for a predetermined period, the operation control signal generation circuit 25 generates an operation control signal (modulated electrical signal) that controls the operations of the power consuming devices 50 under an instruction of the CPU 22 in the power supply control device 20, and the operation control signal is sent to the power consuming devices 50 through the power line conveyance communication circuit 26 and the power line 51. The same applies to the description below. Further, in the description below, the case in which the power supply control device 20 has evaluated (determined) that "the prediction value of the total value $P_{Total}$ has exceeded, or is going to exceed the predetermined power value $P_0$, or a state in which the prediction value of the total value $P_{Total}$ has exceeded the predetermined power value $P_0$ has been continued for a predetermined period" is referred to as "a case in which evaluation of an excess of the power value by the power supply control device 20 has been generated".

In the power control device 10 of Embodiment 1, the storage means 23 stores an order in which the plurality of power consuming devices 50 is connected to the power control device 10 (an order of application of the power to the plurality of power consuming devices 50). When evaluation of an excess of the power value by the power supply control device 20 has been generated, an operation control signal that stops an operation is sent to a power consuming device 50A lastly connected to the power control device 10, among the plurality of power consuming devices 50. The power consuming device 50A that has received the operation control signal stops the operation according to a predetermined procedure. Alternatively, the power supply control device 20 stops the power supply (power transmission) to the power consuming device 50A, or decreases the supply power amount to the power consuming device 50A.

Alternatively, in the power control device 10 of Embodiment 1, the storage means 23 stores power consumption pattern codes of the plurality of power consuming devices 50. Here, the power consumption pattern codes are a code (called "code 1") that indicates a power consuming device in which the power consumption amount is rapidly increased at the time of startup, a code (called "code 2") that indicates a power consuming device in which the power consumption amount substantially varies during an operation, a code (called "code 3") that indicates a power consuming device having small variation of the power consumption amount during an operation, and the like. When evaluation of an excess of the power value by the power supply control device 20 has been generated, an operation control signal that interrupts an operation of a power consuming device 50B to which the code 1 or the code 2 is assigned, among the plurality of power consuming devices 50, is sent. The power consuming device 50B that has received the operation control signal interrupts the operation according to a predetermined procedure. Alternatively, when the power consuming device 50B to which the code 1 or the code 2 is assigned has been started, an operation control signal that stops the startup of the power consuming device 50B to which the code 1 or the code 2 is assigned, an operation signal that stops an operation, or an operation control signal that permits the startup after a certain period elapses is sent. The power consuming device 50B that has received the operation control signal suspends or stops the startup, or resumes the startup after a certain period elapses according to a predetermined procedure. Note that a configuration may be employed, in which the startup of the power consuming device 50B is not immediately performed, and after determination has been made about the case in which evaluation of an excess of the power value by the power supply control device 20 has been generated, the startup of the power consuming device 50B is performed. Alternatively, the power control device 10 stops the power supply (power transmission) to the power consuming device 50B, or decreases the supply power amount to the power consuming device 50B.

Alternatively, in the power control device 10 of Embodiment 1, the storage means 23 stores whether the plurality of power consuming devices 50 is power consuming devices that may take a consumed power decrease state (for example, a power saving mode, a sleep mode, an energy saving mode, or the like). Then, when evaluation of an excess of the power value by the power supply control device 20 has been generated, an operation control signal is sent to a power consuming device 50C that may take the consumed power decrease state among the plurality of power consuming devices 50 so that the power consuming device 50C takes the consumed power decrease state. The power consuming device 50C that has received the operation control signal causes the operation state to the consumed power decrease state according to a predetermined procedure. Then, this operation may just be repeated until the prediction value of the total of the obtained consumed power values does not exceed the predetermined power value.

Alternatively, in the power control device 10 of Embodiment 1, the storage means 23 stores the degree of importance of the plurality of power consuming devices 50. Then, when evaluation of an excess of the power value by the power supply control device 20 has been generated, an operation control signal (a modulated electrical signal, such as an operation stop instruction signal or a power used amount decrease instruction signal, or the like) that interrupts the operations of the power consuming devices 50 is sent to a power consuming device 50 having a lowest degree of importance among the plurality of power consuming devices 50 through the power line 51. The power consuming device 50 that has received the operation control signal interrupts the operation according to a predetermined procedure. Then, the operation control signal that interrupts the operation of the power consuming device 50 may just be sent in order starting from the power consuming device 50 having the lowest degree of importance until the total prediction value of the obtained consumed power values does not exceeds the predetermined power value. Note that it is desirable that the degree of importance of a power consuming device that becomes in a reset state (that is initialized) once the power supply is cut off is set high.

As described above, the power control device 10 of Embodiment 1 or the power control device 10 to which the power consuming devices 50 of the present disclosure are connected evaluates whether a prediction value of a total of consumed power values of a plurality of power consuming devices 50 exceeds a predetermined power value. Therefore, the power control device 10 can finely control power supply to the plurality of power consuming devices 50 from an outside when necessary power is insufficient. Then, the power control device 10 can control power reception corresponding to used amperage from a power company. Therefore, the power control device 10 can avoid a risk that an ampere breaker is suddenly tripped due to excessive use of electricity, or the like. Further, the power control device 10 can control the power saving inside a home, an office, a building, a group of connected power consuming devices as a whole, and can achieve smoothing of the used power amount throughout the day.

[Embodiment 2]

Embodiment 2 is a modification of Embodiment 1. In a power control device 10 of Embodiment 2, a power supply control device 20 obtains nominal consumed power values of power consuming devices 50 as consumed power values. The power control device 10 includes a nominal consumed power value storage device that stores the nominal consumed power values of the power consuming devices 50. The power supply control device 20 then controls power supply to the power consuming devices 50 based on the nominal consumed power values stored in the nominal consumed power value storage device. The nominal consumed power value storage device is, to be specific, integrally configured with the power supply control device 20 in Embodiment 2. That is, the nominal consumed power value storage device is configured from a combination of a CPU 22 and storage means (memory) 23. To cause the nominal consumed power value storage device (to be specific, the storage means 23) to store the nominal consumed power values of the power consuming devices 50, for example, predetermined information including the nominal consumed power values of the power consuming devices 50 may just be input to the nominal consumed power value storage device (storage means 23) using an input device or a personal computer, or communication means such as a mobile phone, and a communication line.

For example, assume that a prediction value of a total of the consumed power values of the plurality of power consuming devices 50 immediately before a power consuming device (for convenience, called "power consuming device 50D") having a nominal consumed power value $P_{nominal}$ is started is a value equal to or less than a predetermined power value $P_0$. Then, when the power supply control device 20 has evaluated (determined) that a prediction value of a grand total $[P_{Total}+P_{nominal}]$ of a total $P_{Total}$ of the consumed power values of the plurality of power consuming device 50 at the time when the power consuming device 50D is started, and the nominal consumed power value $P_{nominal}$ of the power consuming device 50D has exceeded, or is going to exceed the predetermined power value $P_0$, or a state in which the prediction value has exceeded the predetermined power value $P_0$ has been continued for a predetermined period, an operation control signal (a modulated electrical signal, such as an operation stop instruction signal or a power used amount decrease instruction signal) that stops an operation is sent to the power consuming device 50D through a power line 51. The power consuming device 50D that has received the operation control signal suspends, stops, or interrupts the operation according to a predetermined procedure, or is transferred to a consumed power decrease state (for example, a power saving mode, a sleep mode, an energy saving mode, or the like). Alternatively, the power consuming device 50D resumes startup after a certain period has elapsed. Alternatively, the power control device 10 stops power supply (power transmission) to the power consuming device 50D, or decreases (reduces) a supply power amount to the power consuming device 50D.

Alternatively, when the power supply control device 20 has evaluated (determined) that a prediction value of a grand total ($P_{Total-nominal}+P_{D-nominal-start}$) of a total $P_{Total-nominal}$ of the nominal consumed power values of the plurality of power consuming devices 50 at the time when the power consuming device 50D is started and a nominal consumed power value $P_{D-nominal-start}$ of the power consuming device 50D has exceeded, or is going to exceed the predetermined power value $P_0$, or a state in which the prediction value has exceeded the predetermined power value $P_0$ has been continued for a predetermined period, an operation control signal (a modulated electrical signal, such as an operation stop instruction signal or a power used amount decrease instruction signal) that stops an operation is sent to the power consuming device 50D through the power line 51. The power consuming device 50D that has received the operation control signal suspends, stops, or interrupts the operation according to a predetermined procedure, or is transferred to a consumed power decrease state. Alternatively, the power consuming device 50D resumes startup after a certain period has elapsed. Alternatively, the power control device 10 stops power supply (power transmission) to the power consuming device 50D, or decreases (reduces) a supply power amount to the power consuming device 50D.

Alternatively, the power supply control device 20 measures a consumed power value of a predetermined power consuming device 50E, and controls the power supply to the power consuming device 50 of the predetermined power consuming device 50E based on a difference between a nominal consumed power value $P_{E-nominal}$ and a measurement value $P_{E-consump}$ of the consumed power value of the predetermined power consuming device 50E. To be specific, when the difference between the $P_{E-nominal}$ and the $P_{E-consump}$ becomes larger than a predetermined threshold, the $P_{E-nominal}$ is replaced with the $P_{E-consump}$ and the $P_{Total-nominal}$ is calculated, and when the power supply control device 20 has evaluated (determined) that a prediction value of the $P_{Total-nominal}$ has exceeded, or is going to exceed the predetermined power value $P_0$, or a state in which the prediction value has exceeded the predetermined power value $P_0$ has been continued for a predetermined period, an operation control signal (a modulated electrical signal, such as an operation stop instruction signal or a power used amount decrease instruction signal) that stops an operation is sent to the power consuming device 50E through a power line 51. The power consuming device 50E that has received the operation control signal suspends, stops, or interrupts the operation according to a predetermined procedure, or is transferred to a consumed power decrease state. Alternatively, the power consuming device 50E resumes startup after a certain period has elapsed. Alternatively, the power control device 10 stops power supply (power transmission) to the power consuming device 50E, or decreases (reduces) a supply power amount to the power consuming device 50E.

[Embodiment 3]

Embodiment 3 is a modification of Embodiment 1 or Embodiment 2. A power control device 10 of Embodiment 3 further includes a power supply priority order storage device that stores a priority order of power supply to power consuming devices 50. The power supply priority order storage device stores power consuming devices 50 which stop of power supply, stop of an operation, a decrease in a power supply amount, or a decrease in a power used amount should be prohibited. The power supply priority order storage device is configured from a combination of a CPU 22 and storage means (a memory, or the like) 23, and is integrally configured with a power supply control device 20.

A power supply control device 20 obtains consumed power values of the power consuming devices 50, and evaluate whether a prediction value of a total of the obtained consumed power values exceeds a predetermined power value. When evaluation of an excess of the power value by the power supply control device 20 has been generated, the power supply control device 20 performs stop of power supply, stop of an operation, a decrease in a power supply amount, or a decrease in a power used amount to the power consuming devices 50 according to the power supply priority order.

Alternatively, the power supply control device 20 performs an inquiry to the power consuming devices 50 before starting stop of power supply or a decrease in a power supply amount, and when having received information that the power consuming devices 50 being the power consuming devices 50 which stop of power supply, stop of an operation, a decrease in a power supply amount, or a decrease in a power used amount should be prohibited from the power consuming devices 50, the power supply control device 20 does not perform the stop of power supply, and the like to the power consuming devices 50, and performs stop of power supply, stop of an operation, a decrease in a power supply amount, or a decrease in a power used amount to other power consuming devices 50.

In Embodiment 3, the power supply priority order storage device stores the power consuming devices 50 which stop of power supply, stop of an operation, a decrease in a power supply amount, or a decrease in a power used amount should be prohibited, and when evaluation of an excess of the power value by the power supply control device 20 has been generated, the power supply control device 20 performs stop of power supply, stop of an operation, a decrease in a power supply amount, or a decrease in a power used amount to the power consuming devices 50 according to the power supply priority order. Therefore, the power supply control device 20 can safely perform the stop of the power supply, the stop of an operation, the decrease in a power supply amount, or the decrease in a power used amount to the power consuming devices 50.

[Embodiment 4]

Embodiment 4 is a modification of Embodiments 1 to 3. As illustrated in FIG. 3 about a conceptual diagram of a power control device and power consuming devices, a power control device 10 of Embodiment 4 further includes a power generation facility 40 made of a secondary battery facility. When a prediction value of a total of obtained consumed power values exceeds a predetermined power value $P_0$, a power supply control device 20 performs power supply from the power generation facility 40 to the power consuming devices 50. Accordingly, the power supply to the power consuming devices 50 can be further stably performed.

[Embodiment 5]

Embodiment 5 is a modification of Embodiments 1 to 4. In Embodiment 5, power supplied to power consuming devices 50 includes a packet structure configured from header information including a payload corresponding to the power and a payload length of the payload. The header information includes, for example, information related to a power amount and a type of power, an AC/DC discrimination flag, a voltage value, a power generation/manufacture company code, a classification flag of for business consumption/for home consumption. A power control device 10 includes packet decomposition means (not illustrated), and can discompose/extract the header information from the packet structure and can read out various types of information related to the power configured from the packet structure. In this way, the power control device 10 can select a desired type as a type of the power to be supplied to the power consuming devices 50, for example.

As described above, the present disclosure has been described based on the favorable embodiments. However, the present disclosure is not limited to these embodiments. The configurations and structures of the power control device and the power consuming devices described in the embodiments are examples, and can be appropriately changed. Various devices that configure the power control device may be integrally configured, or may be arranged as separate devices and mutually connected through communication means or signal transmission means, for example.

Note that the present disclosure can also employ the following configurations.

[1] <<Power control device>>

A power control device configured to control power supply from an outside to a plurality of power consuming devices, the power control device including:

a power supply control device configured to obtain consumed power values of the plurality of power consuming devices and predicts consumed power values, and to control power supply to the power consuming devices when a prediction value of a total of the obtained consumed power values based on the prediction exceeds a predetermined power value.

[2] The power control device according to [1], wherein the power supply control device obtains the consumed power values of the power consuming devices by measuring the consumed power values of the power consuming devices.

[3] The power control device according to [1] or [2], wherein the power supply control device obtains nominal consumed power values of the power consuming devices as the consumed power values.

[4] The power control device according to [3], wherein the power supply control device measures a consumed power value of a predetermined power consuming device, and controls power supply to the predetermined power consuming device based on a difference between a nominal consumed power value and a measurement value of the consumed power value of the predetermined power consuming device.

[5] The power control device according to any one of [1] to [4], wherein the control of power supply to the power consuming devices is stop of power supply to the power consuming devices or a decrease in a power supply amount to the power consuming devices.

[6] The power control device according to any one of [1] to [4], wherein the control of power supply to the power consuming devices is an operation stop instruction to the power consuming devices or a power used amount decrease instruction to the power consuming devices.

[7] The power control device according to [6], wherein the instruction to the power consuming devices is performed through a power line connecting the power control device and the power consuming devices.

[8] The power control device according to [7], wherein the instruction to the power consuming devices is performed based on a modulated electrical signal.

[9] The power control device according to any one of [1] to [8], further including:

a power supply priority order storage device configured to store a priority order of power supply to the power consuming devices.

[10] The power control device according to [9], wherein the power supply priority order storage device stores a power consuming device which stop of power supply, stop of an operation, a decrease in a power supply amount, or a decrease in a power used amount should be prohibited.

[11] The power control device according to any one of [1] to [10], further including:

a power generation facility, wherein the power supply control device performs power supply to the power consuming devices from the power generation facility when the prediction value of a total of the obtained consumed power values exceeds a predetermined power value.

[12] The power control device according to [11], wherein the power generation facility is made of a secondary battery facility.

[13] The power control device according to any one of [1] to [12], wherein the control of power supply to the power consuming devices is performed based on used amperage inside an area.

[14] The power control device according to [13], wherein the inside an area is inside a room, inside a home, inside an office, or inside a building.

[15] The power control device according to [13], wherein the inside an area is an installation unit of an ampere breaker.

[16] The power control device according to any one of [1] to [15], wherein power supplied to the power consuming devices has a packet structure configured from header information including a payload corresponding to the power or a payload length of the payload.

[17] <<Power consuming device>>

A power consuming device configured to be connected to a power control device, and to be supplied power from an outside, the power control device including a power supply control device configured to obtain consumed power values of a plurality of power consuming devices and to predict consumed power values, and to control power supply to the power consuming devices when a prediction value of a total of the obtained consumed power values based on the prediction exceeds a predetermined power value, and an operation control signal that controls an operation of the power consuming devices being transmitted from the power supply control device together with supply of power.

REFERENCE SIGNS LIST

10 Power control device
20 Power supply control device (power supply control means)
21 Calculation circuit
22 CPU
23 Storage means (memory)
24 A/D converter 25 Operation control signal generation circuit
26 Power line conveyance communication circuit
30 Wattmeter
31 Power receptacle
40 Power generation facility (power generation means)
50, 50A, 50B, 50C, 50D, and 50E Power consuming device
51 Power line

The invention claimed is:

1. A power control device configured to control power supply from an outside to a plurality of power consuming devices, the power control device comprising:
 a power supply control device configured to obtain consumed power values of the plurality of power consuming devices and predicts consumed power values, and to control power supply to the power consuming devices when a prediction value of a total of the obtained consumed power values based on the prediction exceeds a predetermined power value,
 wherein the power supply control device obtains nominal consumed power values of the power consuming devices as the consumed power values, and
 wherein the power supply control device measures a consumed power value of a predetermined power consuming device, and controls power supply to the predetermined power consuming device based on a difference between a nominal consumed power value and a measurement value of the consumed power value of the predetermined power consuming device.

2. The power control device according to claim 1, wherein the power supply control device obtains the consumed power values of the power consuming devices by measuring the consumed power values of the power consuming devices.

3. The power control device according to claim 1, wherein the control of power supply to the power consuming devices is stop of power supply to the power consuming devices or a decrease in a power supply amount to the power consuming devices.

4. The power control device according to claim 1, wherein the control of power supply to the power consuming devices is an operation stop instruction to the power consuming devices or a power used amount decrease instruction to the power consuming devices.

5. The power control device according to claim 4, wherein the instruction to the power consuming devices is performed through a power line connecting the power control device and the power consuming devices.

6. The power control device according to claim 5, wherein the instruction to the power consuming devices is performed based on a modulated electrical signal.

7. The power control device according to claim 1, further comprising:
 a power supply priority order storage device configured to store a priority order of power supply to the power consuming devices.

8. The power control device according to claim 7, wherein the power supply priority order storage device stores a power consuming device which stop of power supply, stop of an operation, a decrease in a power supply amount, or a decrease in a power used amount should be prohibited.

9. The power control device according to claim 1, further comprising:
 a power generation facility,
 wherein the power supply control device performs power supply to the power consuming devices from the power generation facility when the prediction value of a total of the obtained consumed power values exceeds a predetermined power value.

10. The power control device according to claim 9, wherein the power generation facility is made of a secondary battery facility.

11. The power control device according to claim 1, wherein the control of power supply to the power consuming devices is performed based on used amperage inside an area.

12. The power control device according to claim 11, wherein the inside an area is inside a room, inside a home, inside an office, or inside a building.

13. The power control device according to claim 11, wherein the inside an area is an installation unit of an ampere breaker.

14. The power control device according to claim 1, wherein power supplied to the power consuming devices has a packet structure configured from header information including a payload corresponding to the power or a payload length of the payload.

15. A power consuming device configured to be connected to a power control device, and to be supplied power from an outside,
 the power control device including a power supply control device configured to obtain consumed power values of a plurality of power consuming devices and to predict consumed power values, and to control power supply to the power consuming devices when a prediction value of a total of the obtained consumed power values based on the prediction exceeds a predetermined power value,
 wherein the power supply control device obtains nominal consumed power values of the power consuming devices as the consumed power values, and wherein the power supply control device measures a consumed power value of a predetermined power consuming device, and controls power supply to the predetermined power consuming device based on a difference between a nominal consumed power value and a measurement value of the consumed power value of the predetermined power consuming device, and
 wherein the power supply control device further obtains an operation control signal that controls an operation of the power consuming devices being transmitted from the power supply control device together with supply of power.

16. The power control device according to claim 3, wherein the power supply control device is further configured to resume power supply to the power consuming device after a predetermined period of time.

17. The power control device according to claim 1, wherein the power supply control device is further configured to control power supply to the power consuming devices when the prediction value has exceeded the predetermined power value for a predetermined period of time.

18. The power control device according to claim 1, further comprising:
 a non-transitory computer readable medium configured to store power consumption pattern codes of the plurality of power consuming devices.

* * * * *